United States Patent [19]
Chessman et al.

[11] Patent Number: 5,367,418
[45] Date of Patent: Nov. 22, 1994

[54] SPIN MOTOR ASSEMBLY THAT CONTAINS AN O-RING WHICH SUPPORTS A DISK IN BOTH THE RADIAL AND AXIAL DIRECTIONS

[75] Inventors: H. Ross Chessman, Erie; F. Eugene Dion, Longmont, both of Colo.

[73] Assignee: Maxtor Corporation, San Jose, Calif.

[21] Appl. No.: 975,825

[22] Filed: Nov. 13, 1992

[51] Int. Cl.⁵ ............... G11B 17/022; G11B 17/02
[52] U.S. Cl. .......................... 360/99.12; 360/98.08
[58] Field of Search ............... 360/97.03, 98.02, 98.03, 360/98.08, 99.05, 99.12, 133; 369/258, 271, 264, 269, 270

[56] References Cited

U.S. PATENT DOCUMENTS

| | | | |
|---|---|---|---|
| 4,347,599 | 8/1982 | Vitale | 369/270 |
| 4,604,672 | 8/1986 | Davis et al. | 360/137 |
| 4,945,432 | 7/1990 | Matsudaira et al. | 360/133 |
| 5,243,481 | 9/1993 | Dunckley et al. | 360/99.08 |

FOREIGN PATENT DOCUMENTS

| | | | |
|---|---|---|---|
| 59-58678 | 4/1984 | Japan | 360/99.12 |
| 60-45988 | 3/1985 | Japan | 360/98.02 |
| 60-193156 | 10/1985 | Japan | 360/98.02 |
| 04-67377 | 3/1992 | Japan | |
| 04-251463 | 9/1992 | Japan | |

OTHER PUBLICATIONS

"Hub Assembly for Flexible Disk Media", Beck et al. IBM Technical Disclosure Bulletin, vol. 19, No. 12, pp. 4722–4723, May '77.

"Self–Centering Disk Clamp", Bosier et al. IBM Technical Disclosure Bulletin, vol. 26, No. 12, pp. 6632, May '84.

*Primary Examiner*—Stuart S. Levy
*Assistant Examiner*—Craig A. Renner
*Attorney, Agent, or Firm*—Blakely, Sokoloff, Taylor & Zafman

[57] ABSTRACT

A hub assembly for a hard disk drive that incorporates O-rings that can absorb external loads applied in either an axial direction or a radial direction relative to the hub. The O-rings are compressed by an elastic retainer ring which is captured by a top annular flange of the hub.

10 Claims, 1 Drawing Sheet

SPIN MOTOR ASSEMBLY THAT CONTAINS AN O-RING WHICH SUPPORTS A DISK IN BOTH THE RADIAL AND AXIAL DIRECTIONS

BACKGROUND OF THE INVENTION

1. Field of the Invention

The present invention relates to a hub assembly for a hard disk drive.

2. Description of Related Art

Hard disk drive assemblies typically include a magnetic disk which is coupled to a hub. The hub is connected to a motor which rotates the disk relative to a head/actuator arm assembly. The head of the actuator assembly is adapted to read and write data onto the disk while the disk is rotating. Magnetic disks can be constructed from a relatively brittle material such as ceramic. For this reason, the disk are susceptible to cracking and breaking when subjected to excessive shock forces.

There has been a desire to construct portable hard disk drives that can be removed from the computer and carried by the user. Allowing the user to periodically handle the disk drive may result in the unit being dropped or otherwise subjected to high-G shock loads. Subjecting the disk drive to excessive shock loads may cause the disk to move relative to the hub and magnetic heads of the assembly. Relative movement between the disk and magnetic heads may lead to errors in the subsequent operation of the disk drive. It is therefore desirable to construct a hard disk drive hub assembly which can withstand large shock loads, while maintaining concentricity between the disk and hub. It is also desirable to provide a hard disk drive hub assembly that has a profile small enough to fit within a pocket-size card which can be plugged into a computer system.

SUMMARY OF THE INVENTION

The present invention is a hub assembly for a hard disk drive. The assembly includes a hub that is typically coupled to a spindle shaft and an electric motor. The electric motor rotates the hub relative to the shaft. Coupled to the hub are first and second magnetic disks that are adapted to rotate relative to a head/actuator arm assembly. The disks are separated by an annular spacer that extends around the hub. The first disk is supported by a bottom annular flange that extends from the hub. The second disk is supported by the spacer, first disk and bottom hub flange. The assembly includes a retainer ring which is captured by a retaining groove and a top annular flange of the hub. The assembly also contains first and second elastomeric members located within annular grooves in the hub. The elastomeric members are typically O-rings which can be easily stretched and placed into the grooves.

When installed, the retaining ring applies a pressure to the second elastomeric member. The second elastomeric member is located relative to the second disk so that the pressure from the retaining ring presses the second disk onto the annular spacer. The force on the second disk is transmitted through the spacer to the first disk, which is pressed into the bottom flange of the hub. The annular spacer also applies a pressure on the first elastomeric member. The first O-ring is located within the hub so that the elastomeric member applies a counteractive pressure to both the first disk and the spacer. The second O-ring is located within the hub so that the second elastomeric member applies a counteractive pressure to both the second disk and the retainer ring.

The elastomeric members are flexible enough to deform when an external load is applied to the hub assembly. Deformation of the elastomeric members absorbs the energy of the external load and reduces the stress on the other components of the assembly, particularly the magnetic disks which can be constructed from a brittle material. The elastomeric nature of the O-rings return the disk to the original disk position, so that there is no permanent displacement between the disk and the magnetic heads of the disk drive. The O-rings are located so that the elastomeric members can absorb energy in both an axial direction and a radial direction relative to the hub.

Therefore it is an object of the present invention to provide a hub assembly that can absorb external loads directed in either an axial or radial direction relative to the hub, while maintaining concentricity between the disk and hub.

It is also an object of the present invention to provide a hub assembly that has a profile small enough to allow the hard disk assembly to fit within a pocket-size card.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
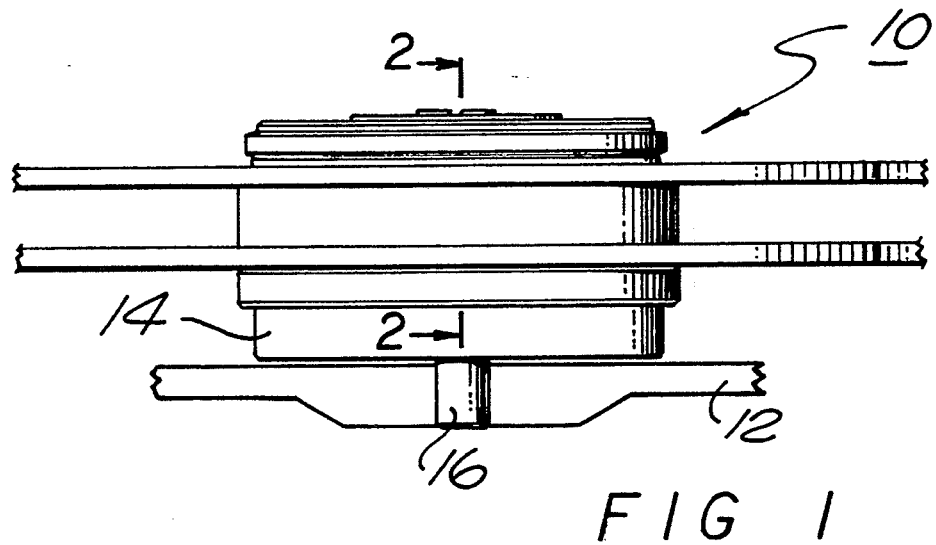
FIG. 1 is a side view of a hub assembly of the present invention.

Referring to the drawings more particularly by reference numbers, FIG. 1 shows a hub assembly 10 of the present invention. The assembly 10 is typically mounted to a baseplate 12 and encapsulated by a cover (not shown). The assembly 10 is also coupled to an head/actuator arm assembly (not shown) that contains a head which can magnetize and sense the magnetic field of the magnetic disk of the assembly. The assembly 10 includes a hub 14 that is coupled to the baseplate 12 by a spindle shaft 16. In the preferred embodiment, the hub 14 contains an electric motor adapted to rotate the hub and magnetic disk relative to the spindle shaft 16. Alternatively, the hub 14 can be coupled to an electric motor located below the assembly 10.

Figure 2:
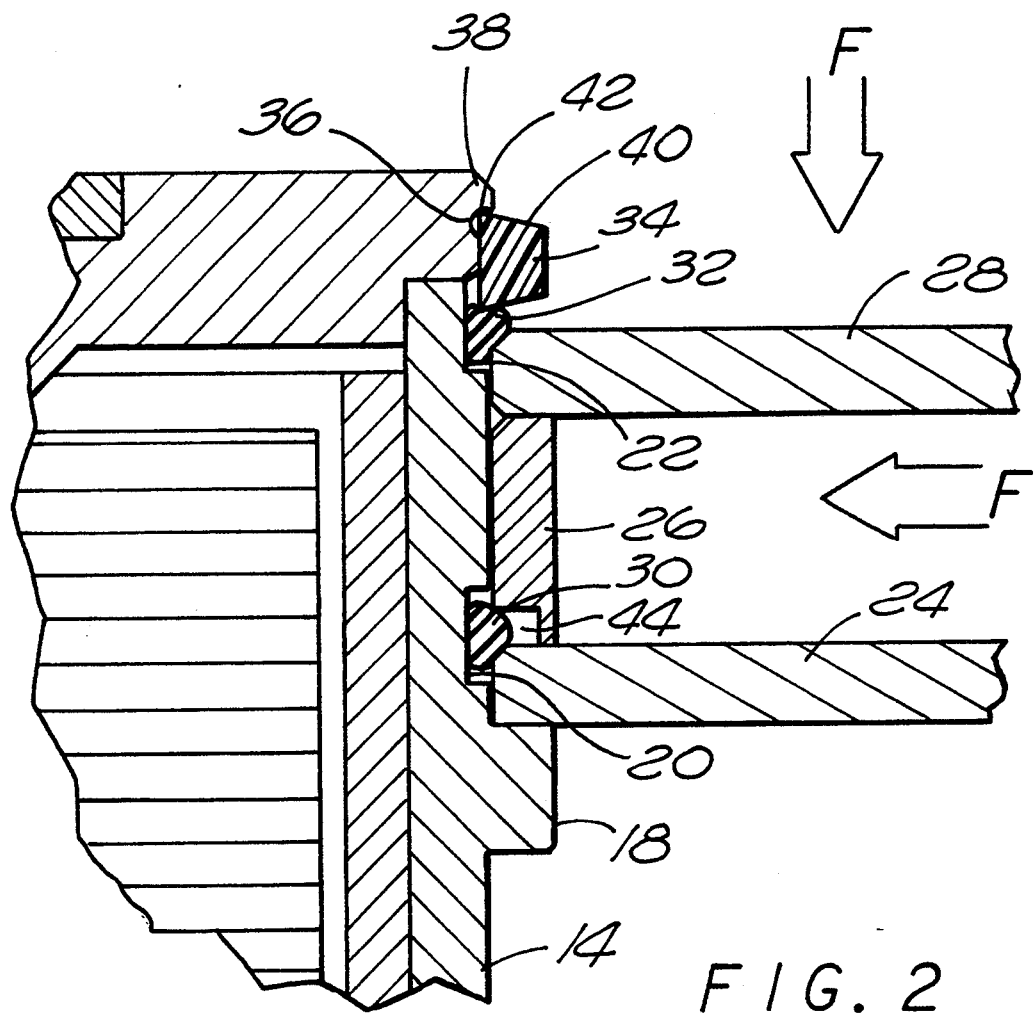
FIG. 2 is a cross-sectional view of the hub assembly, taken at line 2—2 of FIG. 1.

As shown in FIG. 2, the hub 14 has a bottom annular flange 18 located adjacent to the baseplate 12. The hub 14 also has a first annular groove 20 and a second annular groove 22. The assembly 10 includes a first magnetic disk 24 that is supported by the bottom annular flange 18 of the hub 14. Located on top of the first disk 24 is an annular spacer 26 which to supports a second magnetic disk 28. Both the hub 14 and the spacer 26 are preferably constructed from steel. The first 24 and second 28 disks are typically constructed from a ceramic or glass that is coated with a material that can be magnetized.

Located within the first groove 20 is a first elastomeric member 30. Located within the second groove 22 is a second elastomeric member 32. In the preferred embodiment, the elastomeric members are O-rings constructed from a fluoroelastomer that is sold by E. I. du Pont de Nemours under the trademark VITON. The O-rings are flexible enough to be stretched over the hub 14 and placed into the grooves 20 and 22. The elastomeric members 30 is installed before the spacer 26 and second disk 28. The elastomeric member 32 is installed after disk 28 is installed and before retainer ring 34 is installed.

The assembly 10 has a retainer ring 34 that engages the second elastomeric member 32. The ring 34 is captured by a retainer groove 36 and a top annular lip 38 that extends from the hub 14. The ring 34 has an inner diameter that is less than the outer diameter of the top annular lip 38, and is constructed from an elastic material which can be stretched over the top lip 38 and into the retainer groove 36. In the preferred embodiment, the ring 34 is constructed from a polycarbonate material. The ring 34 may have an inner tapered surface 40 with a lip portion 42 that is captured by the top annular lip 38 of the hub.

The retainer ring 34 applies a force to the second elastomeric member 32, which is transmitted by the member 32 to the second magnetic disk 28. The force on the second disk 28 is translated through the annular spacer 26 and onto the first disk 24. The first disk 24 is pressed into contact with the bottom annular flange 18 of the hub 14, securing the disks 24 and 28 to the hub 14.

The spacer 26 has a groove 44 that transmits a force to the first elastomeric member 30. The first O-ring 30 is located off-center from the first disk 24 and spacer 26, so that the elastomeric member 30 exerts a counteractive pressure on the disk 24, the spacer 26 and the hub 14. Likewise, the second elastomeric member 32 is located off-center from the second disk 28 and the retainer ring 34, so that the elastomeric member 32 exerts a counteractive pressure on both the second disk 28 and the ring 34.

The elastomeric members 30 and 32 are constructed to deform when subjected to an external force. The grooves 20 and 22 typically have a volume greater than the volume of the O-rings, so that the elastomeric members can be deflected in the direction of the external force. Additionally, the groove 44 and tapered surface 40 provide additional volume for the elastomers to flow therein. Such a deflection absorbs energy from the external force and reduces the stresses on the assembly, particularly the magnetic disk which are typically constructed from a brittle material. The off-center arrangement of the O-rings allow the elastomeric members to be deflected in either an axial direction or radial direction relative to the hub as indicated by the arrows F.

The present hub assembly can therefore absorb external forces applied to the hub in any direction. In the preferred embodiment, the assembly is installed in a pocket size disk drive assembly which can be carried by the user. Such a hard disk assembly is susceptible to high-G loads which may be caused by the user dropping the assembly. The present invention provides a hub assembly which can more readily survive such loads. The incorporation of the elastic ring 34 also reduces the profile of the hub assembly relative to prior art assemblies, which typically utilize clips or springs to clasp the disks to the hub.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hub assembly for a hard disk drive, comprising:
a hub that has a first groove;
an elastomeric O-ring located within said first groove;
a first magnetic disk coupled to said hub and said O-ring; and;
retainer means for pressing said first magnetic disk into contact with said hub and said O-ring, said O-ring being located relative to said retainer means and said first magnetic disk, such that said O-ring exerts a counteractive force on said retainer means and said first magnetic disk in both a radial direction and an axial direction of said first magnetic disk.

2. The hub assembly as recited in claim 1, wherein said first magnetic disk is located relative to said O-ring such that said O-ring can be deflected in either an axial or radial direction.

3. The hub assembly as recited in claim 1, wherein said retainer means includes an elastic ring that is captured by a top annular lip of said hub, said elastic ring having an inner diameter that is less than an outer diameter of said top annular lip.

4. The hub assembly as recited in claim 3, wherein said elastic ring has a tapered surface and a lip portion that is captured by a retainer groove in said hub.

5. The hub assembly as recited in claim 1, further comprising an elastomeric member located within a second groove in said hub and a second magnetic disk that is coupled to said hub and said elastomeric member, said first disk being separated from said second disk by a spacer, said spacer and said second magnetic disk being located so that said elastomeric member exerts a counteractive force on said second magnetic disk in both a radial direction and an axial direction of said second magnetic disk.

6. The hub assembly as recited in claim 5, wherein said spacer has a groove adjacent to said O-ring.

7. A hub assembly for a hard disk drive, comprising:
a hub with a bottom annular flange and a top annular lip that has an outer diameter, said hub further having a first annular groove, a second annular groove and an annular retainer groove;
a first magnetic disk mounted onto said bottom annular flange of said hub;
an annular spacer mounted onto said first magnetic disk;
a second magnetic disk mounted onto said annular spacer;
a first elastomeric member located within said first annular groove and coupled to said first magnetic disk and said annular spacer;
a second elastomeric member located within said second annular groove and coupled to said second magnetic disk;
an elastic ring that is captured by said top annular lip and said annular retainer groove, said elastic ring having an inner diameter less than said outer diameter of said top annular lip, said elastic ring deflects said first and second elastomeric members so that said first and second magnetic disks are operatively connected to said hub, said first elastomeric members being located such that said first elastomeric member exerts a counteractive force on said annular spacer and said first magnetic disk in both a radial direction and an axial direction of said first magnetic disk and said second elastomeric member being located such that said second elastomeric member exerts a counteractive force on said elastic ring and said second magnetic disk in both a radial direction and an axial direction of said second magnetic disk.

8. The hub assembly as recited in claim 7, wherein said first and second elastomeric members are O-rings.

9. The hub assembly as recited in claim 8, wherein said elastic ring has a tapered surface and a lip portion that is captured by said annular retainer groove.

10. The hub assembly as recited in claim 9, wherein said annular spacer has a groove adjacent to said first elastomeric member.

* * * * *